United States Patent [19]

Spector

[11] 4,309,011

[45] Jan. 5, 1982

[54] ADHESIVE MOUNTING FOR WALL FIXTURES

[76] Inventor: Donald Spector, 380 Mountain Rd., Union City, N.J. 07087

[21] Appl. No.: 107,625

[22] Filed: Dec. 27, 1979

Related U.S. Application Data

[63] Continuation-in-part of Ser. No. 37,047, May 8, 1979, Pat. No. 4,266,369.

[51] Int. Cl.³ .................................................. F16M 13/00
[52] U.S. Cl. .................................................. 248/205 A
[58] Field of Search ................ 248/205 A, 206 R, 467

[56] References Cited

U.S. PATENT DOCUMENTS

| | | | |
|---|---|---|---|
| 2,190,550 | 2/1940 | Simmons | 248/206 R |
| 2,206,159 | 7/1940 | Burgard | 248/206 R |
| 2,340,521 | 2/1944 | Engert | 248/205 R |
| 2,765,998 | 10/1956 | Engert | 248/205 A |
| 2,968,460 | 1/1961 | Vandusen | 248/205 A |
| 3,241,795 | 3/1966 | Frye | 248/467 |
| 3,311,338 | 3/1967 | Culley | 248/205 A |
| 3,350,045 | 10/1967 | Mayers | 248/205 A |

FOREIGN PATENT DOCUMENTS 2250397  5/1975  France ............................. 248/467

*Primary Examiner*—William H. Schultz
*Attorney, Agent, or Firm*—Michael Ebert

[57] ABSTRACT

A wall fixture assembly for adhesively mounting an object onto a wall. Though capable of carrying relatively heavy loads, the assembly is readily removable from the wall without impairing the surface thereof. It is constituted by a base sheet and a fixture having a flat foot, the base sheet having an underface coated with a layer of pressure-sensitive adhesive whereby the sheet may be pressed against the wall at a desired site and conformed thereto. The flat foot of the fixture whose area is much smaller than that of the sheet is covered with a layer of high-strength adhesive. In installing the assembly, first the sheet is adhered to the wall and conformed thereto, and then the foot of the fixture is pressed against the sheet at the center zone thereof and firmly adhered thereto. A heavy load thereafter imposed on the fixture will not dislodge it from the wall, in that the base sheet interposed between the fixture and the wall acts as a load distributor therefor. The fixture is further provided with an array of outriggers whose extremities engage the outer face of the base sheet at points displaced from the foot to resist bending moments, further enhancing the load-bearing characteristics of the assembly. To remove the installation, one simply peels the sheet from the wall.

7 Claims, 5 Drawing Figures

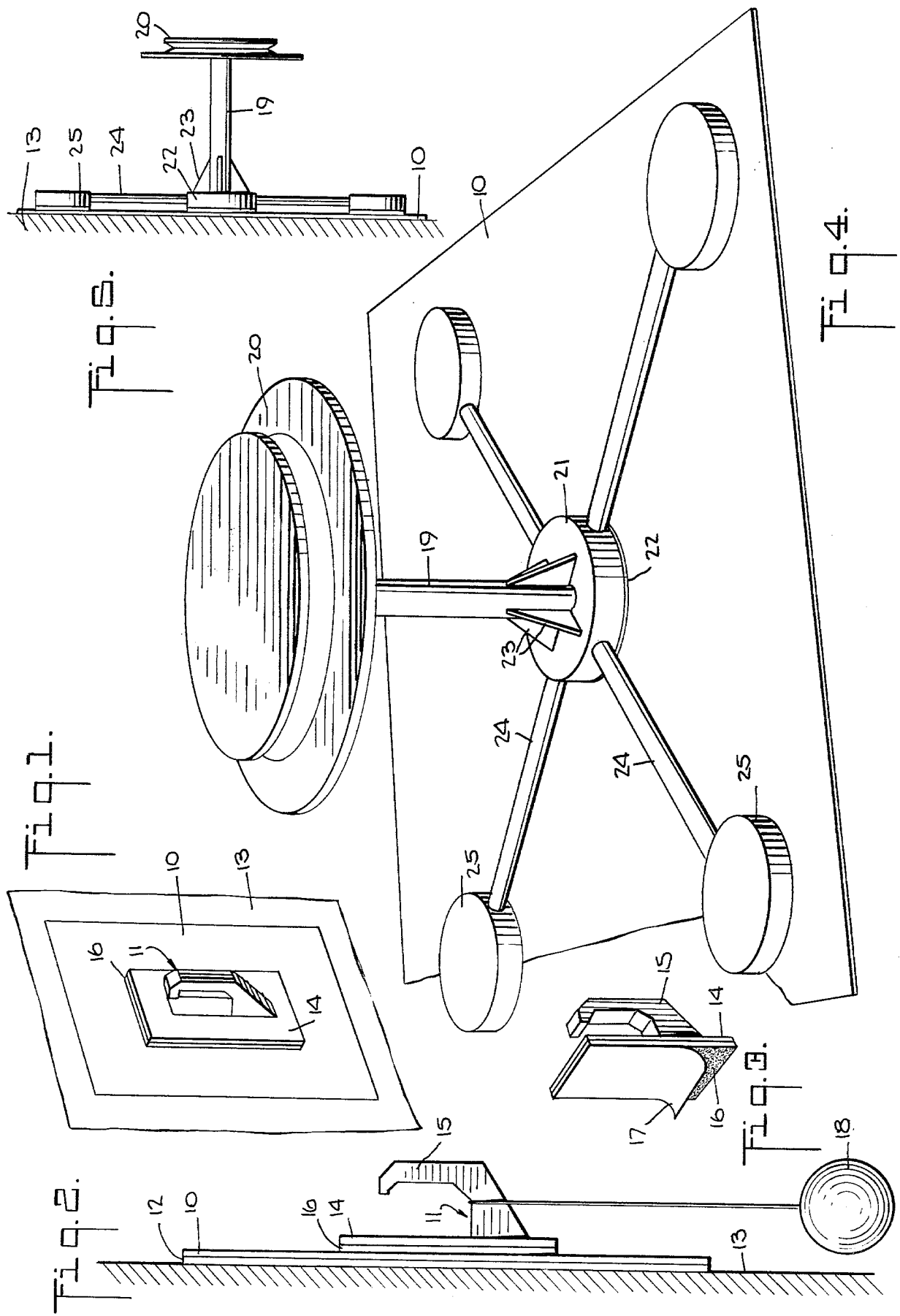

ADHESIVE MOUNTING FOR WALL FIXTURES

RELATED APPLICATION

This application is a continuation-in-part of my co-pending application Ser. No. 037,047, filed May 8, 1979, now U.S. Pat. No. 4,266,369, entitled "TOY CABLEWAY," whose entire disclosure is incorporated herein by reference.

BACKGROUND OF INVENTION

This invention relates generally to adhesive mountings for wall fixtures, and more particularly to a mounting assembly which, though of exceptional strength, can readily be withdrawn from the wall without in any way impairing the wall surface.

The term "wall fixture," as used herein, is intended to encompass any form of bracket, hook, standard, hanger or other device attachable to a wall for the purpose of supporting or suspending an object therefrom.

The typical household or office wall is fabricated of plaster or plaster board, the outer surface of which is painted or covered by wall paper. If one wishes to securely mount a fixture on the wall to support a relatively heavy object, this is ordinarily done by screw-receiving wall plugs, screw anchors or anchor bolts insertable in holes drilled in the wall. When it later becomes necessary to remove the fixtures and the wall anchors therefor, holes remain in the wall which are unsightly and therefore require patching. In the case of a papered wall, such patching does not replace the holes drilled in the paper.

In those situations in which the fixtures are to be temporarily attached to a wall or where the drilling of holes therein is interdicted, it is the present practice to make use of fixtures having a pressure-sensitive base, such as the fixtures disclosed in my copending application, above-identified. With these fixtures, all that need be done is to press the fixture against the wall.

The quality of pressure-sensitive adhesives now commercially available is such that a very strong adhesive bond can be created between the fixture and the wall. Indeed, the bond is often so strong that when the magnitude of the load is such as to rupture this bond, the adhesive carries with it a portion of the wall plaster, leaving an unsightly scar thereon. And even when the fixture is deliberately removed from the wall, it is difficult to do so without marring the wall surface.

If in order to avoid mutilating the wall surface, use is made of a more easily detached pressure-sensitive adhesive which does not take the plaster or paint with it when removing a fixture from the wall, the resultant adhesive bond is generally too weak to permit the fixture to support anything other than very light loads.

The most pertinent prior art references uncovered in a preliminary search are the following:

The U.S. patent to Engert, U.S. Pat. No. 2,133,915, which discloses an arrangement to support a tin can against a wall, use being made of a small metal bracket adapted to engage the rim of the can, the bracket being connected by eyelets to a base sheet of relatively large area which has a pressure-sensitive layer to adhere the sheet to a wall.

The U.S. patent to Shibata, U.S. Pat. No. 3,128,072, in which a base sheet which is adhesively attached to a wall, has welded thereon an article holder.

The U.S. patent to Frye, U.S. Pat. No. 4,003,538, which discloses a multi-layer plastic structure with a hook embedded in an intermediate layer, the base layer being adhered to the wall.

Also of interest are the U.S. Pat. Nos. 2,968,460 (Van Dusen): 3,259,348 (Dann); 2,486,593 (Gardner); and 3,079,117 (Margulis).

SUMMARY OF INVENTION

In view of the foregoing, the main object of this invention is to provide a fixture assembly for securely supporting an object on a wall, which assembly makes use of an adhesive mounting which is easily detached from the wall.

More particularly, it is an object of the invention to provide a wall fixture assembly of the above type which is capable of supporting exceptionally heavy loads without dislodging the fixture, the assembly including a base sheet which acts to distribute the load on the wall.

A significant feature of the invention resides in the fact that the base sheet, which makes intimate adhesive contact with the wall and is interposed between the fixture and wall, is readily peeled therefrom without in any way impairing the wall surface, so that while the adhesive bond between the fixture and the base sheet is extremely difficult to break, this difficulty does not apply to the bond between the base sheet and the wall, for the base sheet can easily be peeled off the wall.

Yet another object of the invention is to provide an adhesive mounting wall fixture assembly which can be manufactured and sold at relatively low cost.

Briefly stated, these objects are attained in a wall fixture assembly constituted by a base sheet and a fixture having a flat foot, the base sheet being formed by a flexible plastic film whose underface is coated with a layer of pressure-sensitive adhesive whereby the sheet may be pressed against the wall at a desired installation site and intimately conformed thereto.

The flat foot of the fixture, whose area is much smaller than that of the sheet, is covered by a double-faced pressure-sensitive adhesive layer of high strength, one face adhering to the foot and the other being pressed against the wall-applied face sheet at the central zone thereof to form a strong bond therewith.

A heavy load thereafter imposed on the fixture will not dislodge it from the wall, in that the base sheet interposed between the fixture and the wall acts as a load distributor therefor. The fixture is further provided with an array of outriggers whose extremities engage the outer face of the base sheet at points displaced from the foot to resist bending moments, further enhancing the load bearing characteristics of the assembly.

Adhesive contact with the wall surface is only by way of the base sheet, this large area adhesive coupling being highly resistant to shear forces. Hence even exceptionally heavy downward load forces imposed on the fixture and translated into shear forces on the base sheet will not act to displace the base sheet. Nevertheless, the base sheet can readily be taken from the wall surface by peeling it off, thereby removing the entire assembly therefrom without impairing the wall surface.

OUTLINE OF DRAWINGS

For a better understanding of the invention as well as other objects and further features thereof, reference is made to the following detailed description to be read in conjunction with the accompanying drawings, wherein:

FIG. 1 is a perspective view of one preferred embodiment of a wall fixture assembly in accordance with the

DESCRIPTION OF INVENTION

First Embodiment

Referring now to FIGS. 1 to 3, there is shown a wall fixture adhesive-mounting assembly in accordance with the invention, the assembly being constituted by a base sheet 10 and a fixture 11. In the example shown, fixture 11 takes the form of a hook from which one can suspend an object of some sort, such as clothing on a hanger or a toy.

Base sheet 10 is formed by a rectangular sheet of flexible plastic material, such as polyvinyl chloride film, whose underface is coated with a layer 12 of pressure-sensitive adhesive. The outerface of the sheet is smooth, and in practice may be printed with a decorative pattern or picture. Suitable for use as base sheet 10 is commercially available so-called "Contact Paper" whose adhesive surface is protected by a removable liner that is peeled off to expose the adhesive just before the "Contact Paper" is applied to a wall surface. While a rectangular base sheet is shown, in practice it may be disc-shaped or in any other geometric form, as long as its area is relatively large.

Base sheet 10 is pressed against a wall 13 at the desired installation site, pressure being manually applied over the entire area of the sheet to ensure that the sheet adheres and intimately conforms to the wall surface without any air bubbles therebetween.

Fixture 11 is constituted by a flat or planar rectangular foot plate 14 from which a hook 15 projects, the hook being integral with this plate. The area of foot plate 14 is small relative to the area of rectangular base sheet 10. Attached to the undersurface of foot plate 14 is a double-faced adhesive pad 16 preferably of the type marketed commercially by the 3M Company. This pad, which is formed of flexible foam plastic material has a pressure-sensitive adhesive inner face which is adhered to the undersurface of the foot plate and an outer adhesive face protected by a peel-off liner 17. The pressure-sensitive adhesive used in this product is of high strength, so much so that if the fixture were applied directly to a plaster wall surface, the bond therewith could not be broken without rupturing the plaster.

After base sheet 10 is adhered and conformed to the wall surface at the installation site, liner 17 is peeled off from fixture 11, and the outer adhesive face on the foot plate is firmly pressed against the wall-applied base sheet at the central zone thereof, as shown in FIG. 1. Adhesion of the fixture to the base sheet before the sheet is applied to a wall surface is undesirable; for then it would be quite difficult to uniformly adhere the sheet to the wall surface and conform it thereto through its entire area.

The strength of the adhesion bond between the fixture foot and the base sheet per unit area is far greater than that between the base sheet and the wall surface because of the nature of the adhesives employed. However, base sheet 10 acts as a load distributor for the fixture; hence the combination of a fixture adhered to the base sheet and a base sheet adhered to the wall is highly resistant to a load, such as that represented by metal ball 18 in FIG. 2.

This ball, which is suspended from hook 15, imposes a downward force on fixture 11 attached to the wall. This in turn gives rise to a tangential shearing force seeking to slide foot 14 of the fixture relative to sheet 10. But since the adhesive bond between the foot and the sheet is of very high strength, no displacement of the fixture relative to the sheet is possible. Consequently, the shearing force is transmitted to base sheet 10 relative to wall surface 13.

And while the adhesive contact between the base sheet and the wall surface is relatively weak per unit area, because this adhesive contact is spread over a large wall surface area in intimate conformity to the sheet, the base sheet is highly resistant to the applied shearing force.

The shearing force imposed by load 18 on fixture 11 is the major component of force in the arrangement shown in FIG. 2. There is also a bending moment produced by load 18 which seeks to move fixture 11 about its point of connection to base sheet 10. However, since hook 15 only projects slightly from foot plate 14, the distance between the point at which the load is imposed and the point of contact on the base sheet is quite short, and the bending moment is small.

But assuming a large bending moment, since this too is transferred to the base sheet by the fixture, even though the adhesive contact between the base sheet and the wall surface per unit area is weak, the base sheet will not be pulled away from the wall surface because of the large area of adhesive contact therebetween.

In practice, where several objects are to be supported from a wall in close proximity to each other, use may be made of an oversize base sheet common to several fixtures for supporting these objects.

Second Embodiment

As shown in FIGS. 4 and 5, the fixture in this instance takes the form of a standard 19 for supporting a rotatable pulley 20 for use in a wall cableway, as disclosed in my copending patent application. Standard 19 is anchored on a round foot or pedestal 21 whose underside is provided with a double-faced pressure-sensitive adhesive pad 22. The pedestal is adhered to base sheet 10 in the same manner as in the first embodiment.

Because in this embodiment the length of standard 19 is such that a heavy load gives rise to a large bending moment, standard 19 is stabilized by reinforcing fins 23. In addition, an array of radially-extending outriggers 24 is provided. Each outrigger is attached to pedestal 22 and terminates in a round block 25. The blocks engage base sheet 10 at points displaced outwardly from pedestal 22. These outriggers, therefore, offer high resistance to bending moments.

While there have been shown and described preferred embodiments of adhesive mounting for wall fixtures in accordance with the invention, it will be appreciated that many changes and modifications may be made therein without, however, departing from the essential spirit thereof.

I claim:
1. A wall-mounting fixture assembly comprising:
   (a) a base sheet having an underface of pressure-sensitive material of relatively low strength per unit area, said base sheet being manually pressable against a wall surface at a desired site to conform intimately thereto; and

(b) a fixture having a flat foot covered by a layer of pressure-sensitive material of high strength per unit area, whereby when the foot is pressed against the wall-applied base sheet at the central zone therein, it is strongly bonded thereto, the base sheet interposed between said foot and said wall acting as a load distributor for said fixture whereby the fixture is capable of supporting relatively heavy loads, said base sheet being readily peelable from said wall surface when removal of said assembly is desired.

2. An assembly as set forth in claim 1, wherein said base sheet is formed of plastic film material.

3. An assembly as set forth in claim 1, wherein said fixture is a hook.

4. An assembly as set forth in claim 1, wherein said fixture is a standard supporting a rotatable pulley.

5. An assembly as set forth in claim 1, wherein said foot is covered by a double-faced pad of pressure-sensitive material, the inner face of which adheres to said foot and the outer face to said base sheet.

6. An assembly as set forth in claim 5, wherein said pad is protected by a removable liner.

7. An assembly as set forth in claim 1, wherein said fixture has outriggers extending therefrom whose extremities engage said sheet at points displaced from said foot to resist bending moments.

* * * * *